United States Patent
Kim et al.

(10) Patent No.: US 10,266,135 B2
(45) Date of Patent: Apr. 23, 2019

(54) SYSTEM AND METHOD FOR CONTROLLING A DARK CURRENT OF A VEHICLE

(71) Applicants: HYUNDAI MOTOR COMPANY, Seoul (KR); KIA MOTORS CORPORATION, Seoul (KR)

(72) Inventors: Woo Kuen Kim, Seoul (KR); Jin Gu Kwon, Seoul (KR); Myoung Soo Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/814,078

(22) Filed: Nov. 15, 2017

(65) Prior Publication Data

US 2018/0361962 A1    Dec. 20, 2018

(30) Foreign Application Priority Data

Jun. 15, 2017  (KR) ........................ 10-2017-0075898

(51) Int. Cl.
*B60R 16/033* (2006.01)
*B60L 11/18* (2006.01)
*B60R 16/04* (2006.01)
*H02H 3/10* (2006.01)
*H02J 7/00* (2006.01)

(52) U.S. Cl.
CPC ........ *B60R 16/033* (2013.01); *B60L 11/1859* (2013.01); *B60R 16/04* (2013.01); *H02H 3/105* (2013.01); *H02J 7/0063* (2013.01)

(58) Field of Classification Search
CPC ... B60R 16/033; B60R 16/04; B60L 11/1859; H02L 3/105; H02J 7/0063
USPC .......................................................... 701/25
See application file for complete search history.

(56) References Cited

U.S. PATENT DOCUMENTS

| 5,633,537 A | 5/1997 | Kurata et al. |
| 9,007,065 B2 | 4/2015 | Shimizu |
| 2008/0035235 A1* | 2/2008 | Kobayashi ............. B60K 15/00 141/94 |

(Continued)

FOREIGN PATENT DOCUMENTS

| JP | H05340788 | 12/1993 |
| JP | H1070843 | 3/1998 |

(Continued)

*Primary Examiner* — Marthe Y Marc-Coleman
(74) *Attorney, Agent, or Firm* — Lempia Summerfield Katz LLC

(57) ABSTRACT

A system for controlling a dark current of a vehicle includes: a storage device storing address information of a customer; a navigation device acquiring current location information of a vehicle; a start detection device detecting a start of the vehicle to acquire start information; and a dark current controller determining whether to switch an initially set operation mode based on the address information, the current location information, and the start information. A method for controlling a dark current of the vehicle includes: storing the address information; acquiring the current location information; acquiring the start information; and determining whether to switch an initially set operation mode based on the address information, the current location information, and the start information.

19 Claims, 5 Drawing Sheets

(56) References Cited

U.S. PATENT DOCUMENTS

| | | | | |
|---|---|---|---|---|
| 2013/0154354 A1* | 6/2013 | Hayashi | ............... | H02J 9/00 |
| | | | | 307/9.1 |
| 2013/0249492 A1* | 9/2013 | Kim | ............... | H02J 7/007 |
| | | | | 320/128 |
| 2013/0297147 A1* | 11/2013 | Cheon | ............... | B60R 16/03 |
| | | | | 701/36 |
| 2014/0104739 A1* | 4/2014 | Nakamoto | ............ | H01M 10/42 |
| | | | | 361/160 |
| 2015/0032640 A1 | 1/2015 | Esselink et al. | | |
| 2016/0155086 A1 | 6/2016 | Fuller et al. | | |

FOREIGN PATENT DOCUMENTS

| | | |
|---|---|---|
| KR | 101214851 | 12/2012 |
| KR | 20120136496 | 12/2012 |

* cited by examiner

SYSTEM AND METHOD FOR CONTROLLING A DARK CURRENT OF A VEHICLE

CROSS-REFERENCE TO RELATED APPLICATION

This application is based on and claims the benefit of priority to Korean Patent Application No. 10-2017-0075898, filed on Jun. 15, 2017, in the Korean Intellectual Property Office, the disclosure of which is incorporated herein in its entirety by reference.

TECHNICAL FIELD

The present disclosure relates to a system and a method for controlling a dark current of a vehicle and, more particularly, to managing mode switching of a system for controlling a dark current of a vehicle.

BACKGROUND

In general, when a user turns off a power switch of an electrical device, electric power related to a basic operation of the electrical device is cut off, but a current is continuously supplied to basic elements (a controller and the like) of the electrical device to allow the electrical device to react and operate immediately after the user turns on the electrical device. Such a current is referred to as "dark current".

For example, when a vehicle is turned off, a current supplied from a battery to various load devices, such as a starting device and a radio, is interrupted. However, the current is continuously supplied to a controller providing various convenience functions such as remote key entry (RKE) even in a state in which the vehicle is turned off. Thus, if it takes a long time before a newly manufactured vehicle is delivered to a customer, or a newly manufactured vehicle is not operated for a long time for export, the battery may be discharged since the dark current always flows in the load devices using the battery power (B+) of the vehicle.

A conventional dark current controller is mounted in a smart junction box (SJB) located between the battery and the load devices and controls a dark current flowing to the load devices. In other words, the dark current controller includes a mode switch as a physical switch. The mode switch is initially set to an OFF state (dark current interruption). The dark current controller interrupts the dark current flowing to the load devices.

In the conventional dark current controller, the mode switch is set to OFF before the vehicle is delivered to the customer to interrupt the dark current (pre-delivery mode). The mode switch is set to ON when the vehicle is delivered to the customer (post-delivery mode). However, this operation is performed manually by a dealer. The dealer often forgets to turn on the mode switch and delivers the vehicle to the customer without setting the mode switch to ON.

When the mode switch is kept in the OFF state even after the vehicle is delivered to the customer, various convenience functions do not operate normally. This may not only cause discomfort to the customer but also reduce reliability of the vehicle.

The conventional dark current controller is manually controlled by a vehicle operator when switching its mode from the pre-delivery mode to the post-delivery mode. As a result, the reliability of the vehicle may be reduced.

SUMMARY

The present disclosure has been made to solve the above-mentioned problems occurring in the prior art while advantages achieved by the prior art are maintained intact.

An aspect of the present disclosure provides a system for controlling a dark current of a vehicle to which two modes for controlling a dark current flowing to a load device are applied. The two modes for controlling the dark current flowing to a load device may include a manufacturer management mode (pre-delivery mode) and a customer management mode (post-delivery mode). The system for controlling the dark current may be configured to switch the initially set manufacturer management mode to the customer management mode without a physical switch for mode switching. Since there is no need for the driver to manually operate the physical switch for mode switching, the size of a circuit to achieve miniaturization is reduced and the driver's convenience is also improved. It is also an aspect of the present disclosure to provide a method for controlling the dark current of the vehicle.

The objects of the present disclosure are not limited to the foregoing objects. Any other objects and advantages not mentioned herein will be clearly understood from the following description. The present inventive concept will be more clearly understood from the embodiments of the present disclosure. In addition, it will be apparent that the objects and advantages of the present disclosure can be achieved by elements and features claimed in the claims and a combination thereof.

According to an aspect of the present disclosure, a system for controlling a dark current of a vehicle may include: a storage device storing address information of a customer; a navigation device acquiring the current location information of a vehicle; and a start detection device detecting a start of the vehicle to acquire the vehicle start information. The system for controlling a dark current of a vehicle may further include a dark current controller determining whether to switch an initially set operation mode on the basis of the address information of the customer, the current location information of the vehicle, and the start information.

The dark current controller may switch the initially set operation mode when the current location information of the vehicle corresponds to the address information of the customer and the vehicle is started and operated for a threshold time or longer.

The dark current controller may switch an initially set first mode to a second mode.

The dark current controller may count the number of times of starting the vehicle, and switch an initially set first mode to a second mode when the counted number exceeds a threshold.

The dark current controller may stop counting the number after the counted number exceeds the threshold.

The system may further include a cluster acquiring an amount of fuel of the vehicle, wherein the dark current controller may switch an initially set first mode (pre-delivery mode) to a second mode (post-delivery mode) when the amount of fuel exceeds a threshold.

The dark current controller may include an intelligent power switch (IPS) including a first channel and a second channel and supplying or interrupting a dark current to a first load and a second load. The dark current controller may also include a micro control unit (MCU) including a first port, a second port, and a third port. The MCU may be configured to switch a manufacturer management mode to a customer management mode. When in the manufacturer management mode, the MCU outputs a first control signal to the first channel of the IPS through the first port to control the first load and outputs a second control signal to the second channel of the IPS through the second port to control the second load. When in the customer management mode, the MCU outputs the first control signal to the first channel of the IPS through the first port to control the first load, closes the second port, and outputs an activation signal through the third port. The dark current controller may further include a signal generator activated by the activation signal output from the third port of the MCU, generating a signal for supplying the dark current to the second load, and inputting the generated signal to the second channel of the IPS.

The second load may use an uninterruptible power supply.

According to an aspect of the present disclosure, a method for controlling a dark current of a vehicle may include the steps of: storing address information of a customer; acquiring current location information of a vehicle from a navigation device; acquiring vehicle start information from a start detection device; and determining whether to switch an initially set operation mode on the basis of the address information, the current location information of the vehicle, and the start information.

The determining step may include switching the initially set operation mode when the current location information of the vehicle corresponds to the address information of the customer and the vehicle is started and operated for a threshold time or longer.

The operation mode may be switched from an initially set first mode to a second mode.

The method for controlling the dark current of the vehicle may further include the steps of counting the number of times of starting the vehicle and switching an initially set first mode to a second mode when the counted number exceeds a threshold.

The counting step may be stopped when the counted number exceeds the threshold.

The switching step may include outputting a first control signal to a first channel of an IPS through a first port of an MCU to control a first load, closing a second port of the MCU, and outputting an activation signal through a third port of the MCU. The switching step may also include generating, by a signal generator activated by the activation signal, a signal for supplying a dark current to a second load, and inputting the generated signal to a second channel of the IPS. The switching step may further include uninterruptedly supplying, by the IPS, the dark current to the second load.

The second load may use an uninterruptible power supply.

According to another aspect of the present disclosure, a method for controlling a dark current of a vehicle may include the steps of acquiring an amount of fuel of a vehicle from a cluster and switching an initially set first mode to a second mode when the acquired amount of fuel exceeds a threshold.

The method for controlling the dark current of the vehicle may further include the steps of counting the number of times of starting the vehicle and switching the initially set first mode to the second mode when the counted number exceeds a threshold.

The counting step may be stopped when the counted number exceeds the threshold.

The switching step may include outputting a first control signal to a first channel of an IPS through a first port of an MCU to control a first load, closing a second port of the MCU, and outputting an activation signal through a third port of the MCU. The switching step may also include generating, by a signal generator activated by the activation signal, a signal for supplying a dark current to a second load, and inputting the generated signal to a second channel of the IPS. The switching step may further include uninterruptedly supplying, by the IPS, the dark current to the second load.

The second load may use an uninterruptible power supply.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
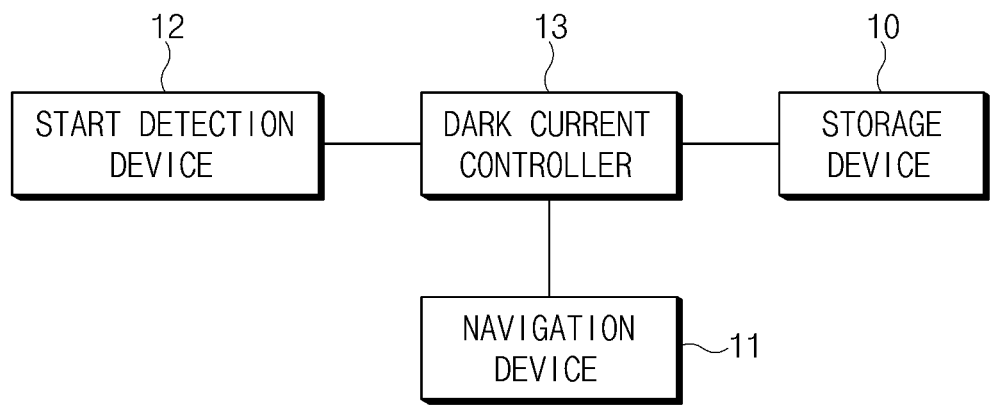
FIG. 1 illustrates the configuration of a system for controlling a dark current of a vehicle, according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure are ruled out in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those having ordinary skill in the art to which the present disclosure belongs. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

FIG. 1 illustrates the configuration of a system for controlling a dark current of a vehicle, according to an embodiment of the present disclosure.

As illustrated in FIG. 1, the system for controlling a dark current of a vehicle, according to an embodiment of the present disclosure, may include a storage device 10, a navigation device 11, a start detection device 12, and a dark current controller 13.

Regarding each of the elements in FIG. 1, the storage device 10 may store the address information of a customer (owner of a vehicle). The storage device 10 may receive and store the address information of the customer from a terminal of a manager when the vehicle is delivered.

The storage device 10 may include at least one of a flash memory, a hard disk, a solid state disk (SSD), a silicon disk drive (SDD), a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The navigation device 11 may detect current location information of the vehicle and transmit the detected information to the dark current controller 13.

The navigation device 11 may include a global positioning system (GPS) module receiving a GPS signal from a satellite and generating first location data of the vehicle on the basis of the received GPS signal. The navigation device 11 may also include a dead-reckoning (DR) sensor generating second location data of the vehicle on the basis of direction and speed of the vehicle and may include a storage unit (or a memory) storing map data and various types of information. The navigation device 11 may further include a map matching unit estimating the location of the vehicle on the basis of the first location data and the second location data, matching the estimated location of the vehicle with a link (map matching link or map matching road) in the map data stored in the storage unit, and outputting the matched map information (map matching result). The navigation device may also include: a communication unit performing telecommunications via a wireless communication network; a control unit generating road guidance information on the basis of the matched map information (the map matching result); a display unit displaying a road guidance map included in the road guidance information or information about conditions of the vehicle; and a voice output unit outputting road guidance voice information (road guidance voice message) included in the road guidance information.

The road guidance information may include not only the map data, but also several types of information related to travelling, such as lane information, speed limit information, turn-by-turn information, traffic safety information, traffic guidance information, vehicle information, and route search information.

The signal received through the GPS module may provide the location information to the navigation device using wireless communication methods proposed by the Institute of Electrical and Electronics Engineers (IEEE), such as the IEEE 802.11 Wireless Network Standard for wireless LANs, some of infrared communications, etc., the IEEE 802.15 Standard for a wireless personal area network (PAN) including Bluetooth, UWB, ZigBee, etc., the IEEE 802.16 Standard for a wireless metropolitan area network (MAN) broadband wireless access (BWA) including fixed wireless accesses (FWA), etc., and the IEEE 802.20 Mobile Internet Standard for a wireless MAN mobile broadband wireless access (MBWA) including Wibro, WiMAX, etc.

The navigation device 11 may further include an input unit. The input unit may select the user's desired function or receive information. Various devices, such as a keypad, a touch screen, a jog shuttle, and a microphone, may be used as the input unit.

The map matching unit may estimate the location of the vehicle on the basis of the first location data and the second location data. The map matching unit may also read map data corresponding to a route from the storage unit.

In addition, the map matching unit may match the location of the vehicle with the link (road) included in the map data and output the matched map information (the map matching result) to the control unit.

For example, the map matching unit may estimate a location of a vehicle on the basis of the first location data and the second location data, match the estimated location of the vehicle with links in map data stored in the storage unit according to the order of links, and output the matched map information (map matching result) to the control unit. The map matching unit may output road information such as a single level road or a multi-level road included in the matched map information (the map matching result) to the control unit. In addition, the function of the map matching unit may also be implemented by the control unit.

The storage unit may store map data. The map data may include geographic coordinates (or latitude and longitude coordinates) representing latitude and longitude in units of degree/minute/second (DMS). Universal transverse mercator (UTM) coordinates, universal polar stereographic (UPS) coordinates, transverse mercator (TM) coordinates, and the like, as well as the geographic coordinates, may also be used as the stored map data.

The storage unit may store several types of information such as various menus, points of interest (POIs), and function characteristics information according to a particular position of map data.

The storage unit may store a user interface (UI) and/or a graphic user interface (GUI).

The storage unit may store data and programs required to operate the navigation device 11.

The storage unit may store destination information input by a user through the input unit. The destination information may be a destination, or any one of a departure point and a destination.

The display unit may display image information (or a road guidance map) included in the road guidance information generated by the control unit. The display unit may include a touch sensor (touch screen) and a proximity sensor. In addition, the road guidance information may include not only the map data, but also various types of information related to travelling, such as lane information, speed limit information, turn-by-turn information, traffic safety information, traffic guidance information, vehicle information, and route search information.

When displaying the image information, the display unit may display various contents, such as various menu screens and road guidance information, using the UI and/or the GUI included in the storage unit. The contents displayed on the display unit may include various text or image data (including map data and various information data), and menu screens including data such as icons, list menus, and combo boxes.

The voice output unit may output voice information included in the road guidance information (or voice message with respect to the road guidance information) generated by the control unit. The voice output unit may include an amplifier or a speaker.

The control unit may generate the road guidance information on the basis of the matched map information. The control unit may also control the display unit and the voice output unit to output the generated road guidance information. The display unit may display the road guidance information.

The control unit may receive real-time traffic information from an information providing center and/or a terminal (a navigation device) mounted in a neighboring vehicle to generate the road guidance information.

The control unit may be connected to a call center through the communication unit to transmit/receive information to/from the call center. The communication unit may further include a handsfree module having a Bluetooth function using short-range wireless communications.

The start detection device 12 may detect a start of the vehicle to acquire the vehicle start information. The start detection device 12 may be provided as a sensor and collect the start information from a vehicle network to detect the start of the vehicle. The vehicle network may include a controller area network (CAN), a local interconnect network (LIN), FlexRay, and media oriented systems transport (MOST).

Two modes for controlling a dark current flowing to a load device may be applied to a vehicle. The two modes may include a manufacturer management mode (pre-delivery mode) and a customer management mode (post-delivery mode). The dark current controller 13 for controlling a dark current of a vehicle may switch the initially set manufacturer management mode to the customer management mode without a physical switch for mode switching.

When the dark current controller 13 receives the location information of the vehicle corresponding to the address information of the customer stored in the storage device 10 from the navigation device 11 and determines that the vehicle is started and operated for a threshold time or longer on the basis of the information from the start detection device 12, the dark current controller 13 may switch the initially set manufacturer management mode (first mode) to the customer management mode (second mode).

In addition, the dark current controller 13 may count the number of times of starting the vehicle and switch the initially set manufacturer management mode (first mode) to the customer management mode (second mode) when the counted number exceeds a threshold. The process of switching the manufacturer management mode to the customer management mode may be performed once.

Figure 2:
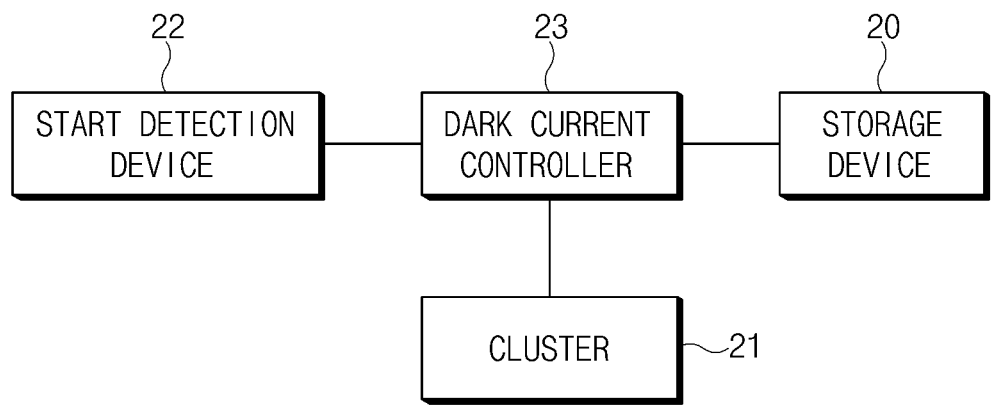
FIG. 2 illustrates the configuration of a system for controlling a dark current of a vehicle, according to another embodiment of the present disclosure.

FIG. 2 illustrates the configuration of a system for controlling a dark current of a vehicle according to another embodiment of the present disclosure.

As illustrated in FIG. 2, the system for controlling a dark current of a vehicle according to an embodiment of the present disclosure, includes a storage device 20, a cluster 21, a start detection device 22, and a dark current controller 23.

Regarding each of the elements in FIG. 2, the storage device 20 may store a threshold (for example, 50 times) for the number of times of starting the vehicle. The number of times of starting the vehicle indicates an attempt to start the vehicle by turning the vehicle from OFF to ON. When the vehicle is turned from OFF to ON, the number of times of starting the vehicle is counted once.

The cluster 21, which is a module displaying several types of information of the vehicle, may display speed, RPM, the amount of fuel, engine temperature, and various conditions of the vehicle. In particular, the cluster 21 may transmit the amount of fuel to the dark current controller 23.

The start detection device 22 may detect a start of the vehicle. The start detection device 22 may be provided as a sensor and may collect the start information of the vehicle from a vehicle network to detect the start of the vehicle. The vehicle network may include CAN, LIN, FlexRay, and MOST.

Two modes for controlling a dark current flowing to a load device may be applied to a vehicle. The two modes may again include a manufacturer management mode (pre-delivery mode) and a customer management mode (post-delivery mode). The dark current controller 23 for controlling a dark current of a vehicle may switch the initially set manufacturer management mode to the customer management mode without a physical switch for mode switching.

When the amount of fuel received from the cluster 21 exceeds a threshold, the dark current controller 23 may switch the initially set manufacturer management mode to the customer management mode.

In addition, the dark current controller 23 may count the number of times of starting the vehicle, and switch the initially set manufacturer management mode to the customer management mode when the counted number exceeds the threshold. The process of switching the manufacturer management mode to the customer management mode may be performed once.

Hereinafter, the configuration of the dark current controller 13 will be described in detail with reference to FIG. 3.

Figure 3:
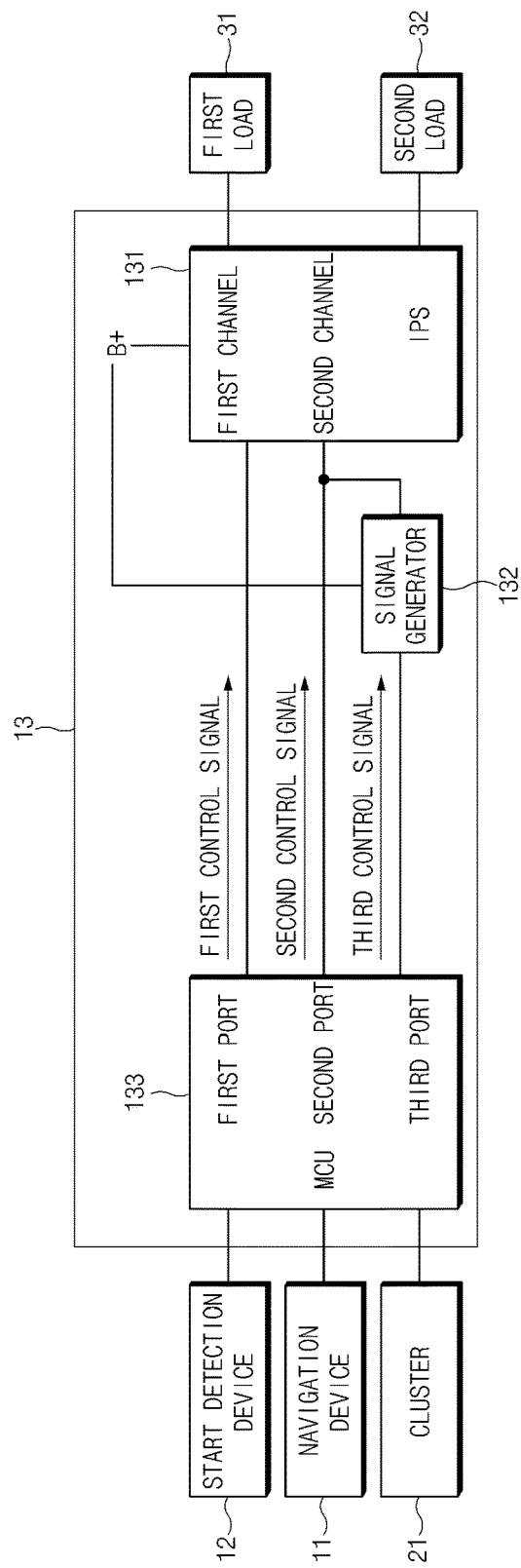
FIG. 3 illustrates the configuration of a dark current controller of a vehicle, according to an embodiment of the present disclosure.

FIG. 3 illustrates the configuration of a dark current controller of a vehicle, according to an embodiment of the present disclosure.

As illustrated in FIG. 3, the dark current controller 13, according to an embodiment of the present disclosure, includes an intelligent power switch (IPS) 131, a signal generator 132, and a micro control unit (MCU) 133.

Regarding each of the elements in FIG. 3, the IPS 131 may supply or interrupt a dark current to a first load 31 and a second load 32 on the basis of a control signal from the MCU 133 in a sleep state (OFF state) of the vehicle. The first load 31 may be a load that is consistently controlled regardless of whether the dark current controller operates in the manufacturer management mode or the customer management mode. The first load 31 does not always require the supply of the dark current even when the operating mode of the dark current controller is switched to the customer management mode. The second load 32 may be a load that is controlled in a different manner when the dark current controller switches the manufacturer management mode to the customer management mode. The second load 32 always requires the supply of the dark current in the customer management mode.

The IPS 131 is an electronic switch that rapidly replaces a fuse and a relay in the vehicle. Unlike the relay switch, the IPS 131 may determine the state of the load and the state of the switch itself, take appropriate actions, and transmit the state of the load to the MCU 133.

In particular, the IPS 131 may provide current limiting, over-temperature protection, open load detection, and short-circuit protection. When the load is open or shorted or the switch itself is overheated, the IPS 131 may limit the output current to prevent damages to the load and the switch, and output a status signal to the MCU 133 to report that the problem has occurred.

Table 1 below depicts a truth table for the status signal of the IPS 131 according to input and state.

TABLE 1

| Operating State | Switch Input | Switch Output | Status Signal Output |
| --- | --- | --- | --- |
| Normal Operation | High | High | High |
|  | Low | Low | High |
| Open Load | High | High | Low |
|  | Low | High | Low |
| Short Circuit to GND | High | Low | Low |
|  | Low | Low | High |

TABLE 1-continued

| Operating State | Switch Input | Switch Output | Status Signal Output |
|---|---|---|---|
| Over Temperature | High | Low | Low |
| | Low | Low | High |

As determined from the truth table, when the load connected to the IPS 131 is not in a normal state (Open Load, Short Circuit to GND), or when the switch is not operating normally (Over Temperature), the output of the status signal is "Low". However, even though it is not in the normal operating state, when the input signal is "Low" and the switch is turned off, the output of the status signal is maintained as "High".

The MCU 133 may receive the status signal output according to the truth table, and determine the state of the load.

The signal generator 132 may be interposed between a third port of the MCU 133 and a second channel (second input channel) of the IPS 131, be activated by an activation signal output from the third port of the MCU 133, generate a high signal (signal supplying a dark current to the second load 32), and input the generated signal to the second channel of the IPS 131. Since the signal generator 132 is always supplied with the battery power (B+) once it is activated, it may allow the IPS 131 to supply the dark current to the second load 32 at all times regardless of the state of the MCU 133.

When operating in the manufacturer management mode, the MCU 133 may output a first control signal to a first channel (first input channel) of the IPS 131 through a first port to control the first load 31. When operating in manufacturer management mode, the MCU may also output a second control signal to the second channel of the IPS 131 through a second port to control the second load 32.

In addition, when operating in the customer management mode, the MCU 133 may output the first control signal to the first channel of the IPS 131 through the first port to control the first load 31, close the second port, and output the activation signal through the third port. In other words, after closing the second port, the MCU 133 may output the activation signal through the third port, thereby switching from the manufacturer management mode to the customer management mode.

For example, when the MCU 133 receives the current location information of the vehicle corresponding to the address information of the customer from the navigation device 11 and determines that the vehicle is started and operated for a threshold time or longer on the basis of the information from the start detection device 12, the MCU 133 may switch the initially set manufacturer management mode to the customer management mode. The MCU 133 may also store the address information of the customer in a memory (not shown) thereof.

In addition, the MCU 133 may count the number of times of starting the vehicle and switch the initially set manufacturer management mode to the customer management mode when the counted number exceeds a threshold. After the counted number exceeds the threshold, the MCU 133 may no longer count the number of times of starting the vehicle in the light of overload and management.

In addition, when the amount of fuel received from the cluster 21 exceeds a threshold, the MCU 133 may switch the initially set manufacturer management mode to the customer management mode.

Figure 4:
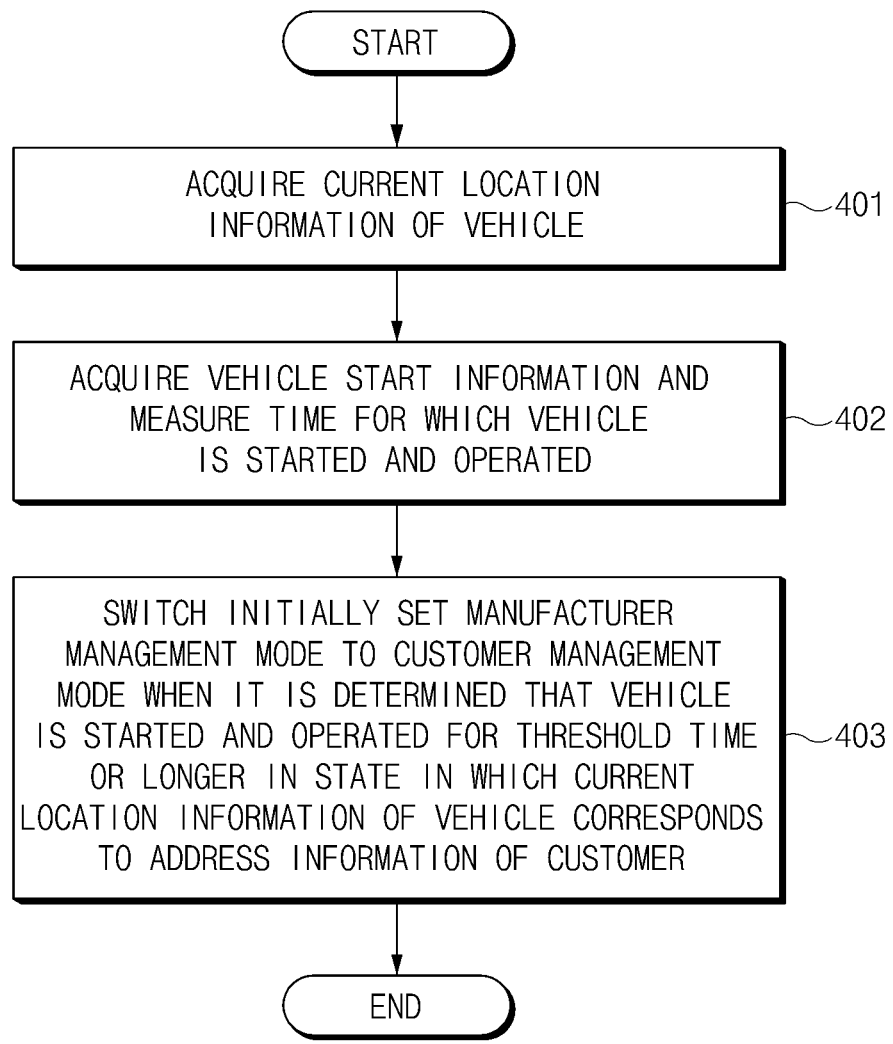
FIG. 4 illustrates a flowchart of a method for controlling a dark current of a vehicle, according to an embodiment of the present disclosure.

FIG. 4 illustrates a flowchart of a method for controlling a dark current of a vehicle according to an embodiment of the present disclosure.

The MCU 133 may acquire current location information of a vehicle from the navigation device 11 in operation or step 401. The MCU 133 may have home address information of a customer stored in a memory (not shown) thereof. Thus, the MCU 133 may match the current location information of the vehicle with the address information of the customer to determine whether the vehicle is located around the customer's home (for example, within 500 m).

After the MCU 133 acquires vehicle start information from the start detection device 12, the MCU 133 may measure a time for which the vehicle is started and operated in operation 402.

Thereafter, when it is determined that the vehicle is started and operated for a threshold time or longer in a state in which the MCU 133 acquires the location information of the vehicle corresponding to the address information of the customer from the navigation device 11, the MCU 133 may switch an initially set manufacturer management mode to a customer management mode in operation 403. In other words, the MCU 133 may switch the manufacturer management mode in which the MCU 133 outputs a first control signal to the first channel of the IPS 131 through the first port to control the first load 31 and outputs a second control signal to the second channel of the IPS 131 through the second port to control the second load 32, to the customer management mode. When operating in the customer management mode, the MCU 133 outputs the first control signal to the first channel of the IPS 131 through the first port to control the first load 31, closes the second port, and outputs an activation signal through the third port.

Then, the signal generator 132 interposed between the third port of the MCU 133 and the second channel of the IPS 131 may be activated by the activation signal output from the third port of the MCU 133. The signal generator 12 may generate a high signal (signal for supplying a dark current to the second load 32) and input the generated signal to the second channel of the IPS 131. The signal generator 132 may continuously generate the high signal or periodically generate the high signal.

The MCU 133 may count the number of times of starting the vehicle and switch the initially set manufacturer management mode to the customer management mode when the counted number exceeds a threshold.

In operation 403, the MCU 133 may receive a mode switching signal from the navigation device 11. The MCU 133 may then immediately switch the initially set manufacturer management mode to the customer management mode without a separate mode switching determination process.

Figure 5:
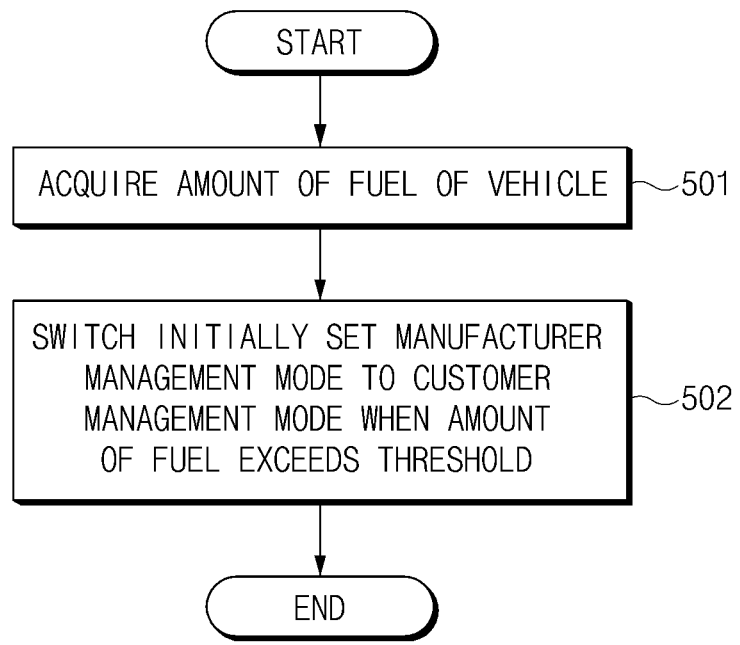
FIG. 5 illustrates a flowchart of a method for controlling a dark current of a vehicle, according to another embodiment of the present disclosure.

FIG. 5 illustrates a flowchart of a method for controlling a dark current of a vehicle, according to another embodiment of the present disclosure.

The MCU 133 may acquire an amount of fuel from the cluster 21 in operation 501.

When the amount of fuel received from the cluster 21 exceeds a threshold, the MCU 133 may switch an initially set manufacturer management mode to a customer management mode in operation 502. In other words, the MCU 133 may switch the manufacturer management mode in which the MCU 133 outputs a first control signal to the first channel of the IPS 131 through the first port to control the first load 31 and outputs a second control signal to the second channel of the IPS 131 through the second port to control the second load 32, to the customer management mode. When operating in the customer management mode, the MCU 133 outputs the first control signal to the first channel of the IPS 131 through the first port to control the first load 31, closes the second port, and outputs an activation signal through the third port.

Then, the signal generator 132 interposed between the third port of the MCU 133 and the second channel of the IPS 131 may be activated by the activation signal output from the third port of the MCU 133. The signal generator 132 may generate a high signal (signal for supplying a dark current to the second load 32) and input the generated signal to the second channel of the IPS 131. The signal generator 132 may continuously generate the high signal or may periodically generate the high signal.

The MCU 133 may count the number of times of starting the vehicle, and switch the initially set manufacturer management mode to the customer management mode when the counted number exceeds a threshold.

In operation 502, when the amount of fuel initially exceeds the threshold, the manufacturer management mode may be switched to the customer management mode. After switching to the customer management mode, even though the amount of fuel exceeds the threshold, the mode switching process may no longer be performed. This is to prevent an additional mode switching process from acting as an unnecessary load.

Two modes for controlling a dark current flowing to a load device may again include a manufacturer management mode (pre-delivery mode) and a customer management mode (post-delivery mode). Hereinabove, the system and the method, for controlling a dark current of a vehicle to which the two modes for controlling the dark current are applied, can switch the initially set manufacturer management mode to the customer management mode without a physical switch for mode switching. As a result, the size of a circuit to achieve miniaturization is reduced.

In addition, since the system and the method for controlling a dark current of a vehicle can switch the initially set manufacturer management mode to the customer management mode without a physical switch for mode switching, the driver's convenience is improved. This improvement is accomplished since there is no longer the need for the driver to manually operate the physical switch for mode switching.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. A system for controlling a dark current of a vehicle, the system comprising:
    a storage device storing address information of a customer;
    a navigation device acquiring current location information of a vehicle;
    a start detection device detecting a start of the vehicle to acquire start information of the vehicle; and
    a dark current controller determining whether to switch an initially set operation mode on the basis of the address information, the current location information, and the start information.

2. The system according to claim 1, wherein the dark current controller switches the initially set operation mode when the current location information of the vehicle corresponds to the address information of the customer and the vehicle is started and operated for a threshold time or longer.

3. The system according to claim 2, wherein the dark current controller switches an initially set first mode to a second mode.

4. The system according to claim 1, wherein the dark current controller counts the number of times of starting the vehicle, and switches an initially set first mode to a second mode when the counted number exceeds a threshold.

5. The system according to claim 4, wherein the dark current controller stops counting the number after the counted number exceeds the threshold.

6. The system according to claim 1, further comprising a cluster acquiring an amount of fuel of the vehicle,
    wherein the dark current controller switches an initially set first mode to a second mode when the amount of fuel exceeds a threshold.

7. The system according to claim 1, wherein the dark current controller comprises:
    an intelligent power switch (IPS) including a first channel and a second channel, the IPS configured to supply or interrupt a dark current to a first load and a second load;
    a micro control unit (MCU) including a first port, a second port, and a third port, the MCU configured to switch a manufacturer management mode, in which the MCU outputs a first control signal to the first channel of the IPS through the first port to control the first load and outputs a second control signal to the second channel of the IPS through the second port to control the second load, to a customer management mode, in which the MCU outputs the first control signal to the first channel of the IPS through the first port to control the first load, closes the second port, and outputs an activation signal through the third port; and
    a signal generator activated by the activation signal output from the third port of the MCU, the signal generator configured to generate a signal for supplying the dark current to the second load, and input the generated signal to the second channel of the IPS.

8. The system according to claim 7, wherein the second load uses an uninterruptible power supply.

9. A method for controlling a dark current of a vehicle, the method comprising steps of:
    storing address information of a customer;
    acquiring current location information of a vehicle from a navigation device;
    acquiring start information of the vehicle from a start detection device; and
    determining whether to switch an initially set operation mode on the basis of the address information, the current location information, and the start information.

10. The method according to claim 9, wherein the determining step comprises switching the initially set operation mode when the current location information of the vehicle corresponds to the address information of the customer and the vehicle is started and operated for a threshold time or longer.

11. The method according to claim 10, wherein the operation mode is switched from an initially set first mode to a second mode.

12. The method according to claim 9, further comprising the steps of:
    counting the number of times of starting the vehicle; and
    switching an initially set first mode to a second mode when the counted number exceeds a threshold.

13. The method according to claim 12, wherein the counting step is stopped when the counted number exceeds the threshold.

14. The method according to claim 9, wherein the determining step comprises:
   outputting a first control signal to a first channel of an intelligent power switch (IPS) through a first port of a micro control unit (MCU) to control a first load, closing a second port of the MCU, and outputting an activation signal through a third port of the MCU;
   generating, by a signal generator activated by the activation signal, a signal for supplying a dark current to a second load, and inputting the generated signal to a second channel of the IPS; and
   uninterruptedly supplying, by the IPS, the dark current to the second load.

15. The method according to claim 14, wherein the second load uses an uninterruptible power supply.

16. A method for controlling a dark current of a vehicle, the method comprising steps of:
   acquiring an amount of fuel of a vehicle from a cluster; and
   switching an initially set first mode to a second mode when the acquired amount of fuel exceeds a threshold, wherein the switching step includes
      outputting a first control signal to a first channel of an intelligent power switch (IPS) through a first port of a micro control unit (MCU) to control a first load, closing a second port of the MCU, and outputting an activation signal through a third port of the MCU,
      generating, by a signal generator activated by the activation signal, a signal for supplying a dark current to a second load, and inputting the generated signal to a second channel of the IPS, and
      uninterruptedly supplying, by the IPS, the dark current to the second load.

17. The method according to claim 16, further comprising the steps of:
   counting the number of times of starting the vehicle; and
   switching the initially set first mode to the second mode when the counted number exceeds a threshold.

18. The method according to claim 17, wherein the counting step is stopped when the counted number exceeds the threshold.

19. The method according to claim 16, wherein the second load uses an uninterruptible power supply.

* * * * *